United States Patent
Heugel

(10) Patent No.: US 7,665,979 B2
(45) Date of Patent: Feb. 23, 2010

(54) DEVICE AND METHOD FOR THE PRODUCTION OF THREE-DIMENSIONAL OBJECTS BY MEANS OF GENERATIVE PRODUCTION METHOD

(75) Inventor: Martin Heugel, Landsberg-Pitzling (DE)

(73) Assignee: EOS GmbH Electro Optical Systems (DE)

( * ) Notice: Subject to any disclaimer, the term of this patent is extended or adjusted under 35 U.S.C. 154(b) by 784 days.

(21) Appl. No.: 10/523,561

(22) PCT Filed: Jul. 11, 2003

(86) PCT No.: PCT/EP03/07536

§ 371 (c)(1),
(2), (4) Date: Feb. 1, 2005

(87) PCT Pub. No.: WO2004/014636

PCT Pub. Date: Feb. 19, 2004

(65) Prior Publication Data

US 2005/0263932 A1    Dec. 1, 2005

(30) Foreign Application Priority Data

Aug. 2, 2002    (DE) ................. 102 35 427

(51) Int. Cl.
B29C 35/08    (2006.01)
(52) U.S. Cl. .................................. 425/174.4
(58) Field of Classification Search ............. 264/401; 425/174.4
See application file for complete search history.

(56) References Cited

U.S. PATENT DOCUMENTS

| | | | |
|---|---|---|---|
| 5,306,447 | A | 4/1994 | Marcus et al. |
| 5,753,274 | A | 5/1998 | Wilkening et al. |
| 6,042,774 | A | 3/2000 | Wilkening et al. |
| 2002/0158054 | A1 | 10/2002 | Manetsberger et al. |
| 2004/0045941 | A1 | 3/2004 | Herzog et al. |

FOREIGN PATENT DOCUMENTS

| | | |
|---|---|---|
| DE | 299 07 262 U1 | 8/1999 |
| DE | 199 52 998 A1 | 5/2001 |
| DE | 100 53 741 C1 | 2/2002 |
| DE | 101 08 612 C1 | 6/2002 |
| EP | 0 734 842 A1 | 10/1996 |
| EP | 1 316 408 A1 | 6/2003 |
| EP | 316 408 A1 | 6/2003 |
| JP | 10-051777 | 9/1999 |

OTHER PUBLICATIONS

Translation of PCT International Preliminary Examination Report dated Mar. 17, 2005; for PCT/EP2003/007536; International Filing Date Jul. 11, 2003.
Translated Abstract of JP10-051777.

*Primary Examiner*—George R Koch, III
(74) *Attorney, Agent, or Firm*—McDonnell Boehnen Hulbert & Berghoff LLP

(57) ABSTRACT

A device and a method for layerwise, generative production of three-dimensional objects are provided. Multiple objects are produced in parallel in distinct process chambers (11, 12, 13, 14) by means of successive application of layers of a building material and subsequent solidifying of a layer and interconnecting of the layer with the previously applied layer, respectively, by means of radiation. The radiation is supplied to a part of the process chambers by a radiation source which is arranged outside of the process chambers, while an application of a layer takes place in another part of the process chambers.

12 Claims, 4 Drawing Sheets

DEVICE AND METHOD FOR THE PRODUCTION OF THREE-DIMENSIONAL OBJECTS BY MEANS OF GENERATIVE PRODUCTION METHOD

This application is a 371 of PCT/EP03/07536.

The present invention relates to a device and to a method for producing three-dimensional objects.

In generative manufacturing methods, as for example selective laser sintering, selective laser melting, stereolithography or 3D printing, three-dimensional objects are produced layerwise by applying layers of a building material and interconnecting them by selective solidification at positions corresponding to the cross-section of the objects.

Such a method and such a device are known from EP 0 734 842, for example, wherein the selective laser sintering of a pulverous building material is described. There, a first layer of a pulverous material is applied onto a lowerable carrier and is irradiated by a laser at the positions corresponding to the object such that the material there sinters together. Thereafter, the carrier is lowered and a second layer is applied onto the first layer and again selectively sintered to thereby get interconnected to the first layer. In this way, the object is formed layerwise. No irradiating takes place during the application of a new layer. In this way, the laser which is one of the most cost-intensive elements of the laser sintering device is not optimally used under economic aspects and the productivity of the device is lowered by interruptions of the irradiating. Additionally, a loss of time due to heating up, cooling down and other steps of the method may appear. Furthermore, it is known to build multiple objects in parallel in such a device if these fit in the building space.

If more objects than the number that fits into the building space shall be produced concurrently, this is principally possible by parallel operation of a plurality of such devices, but this is associated with high investment costs.

Therefore, it is an object of the present invention to provide a device and a method with which the productivity and the economic efficiency in layerwise generative production of three-dimensional objects can be increased in an economical way.

The object is attained by a device according to the claims and by a method according to the claims.

Further developments of the invention are specified in the subordinate claims.

Further features and advantages of the invention will arise from the description of embodiments with reference to the figures. From the figures.

FIRST EMBODIMENT

Figure 1:
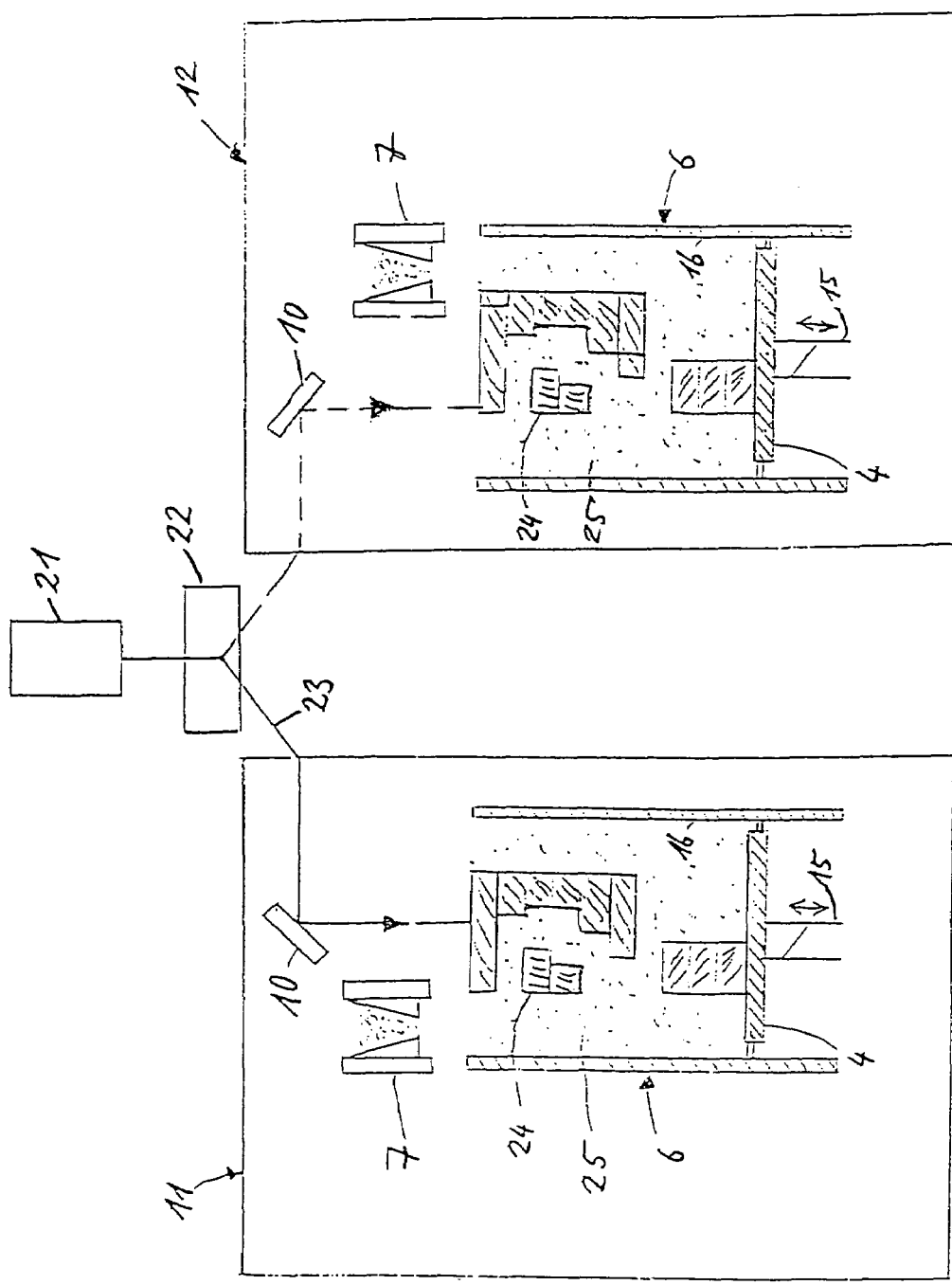
FIG. 1 shows a schematic side view of a device according to a first embodiment of the present invention.

FIG. 1 shows a cross-sectional view of a laser sintering device according to a first embodiment of the invention as an example of a device for layerwise production of three-dimensional objects from a building material which is solidifiable by means of electromagnetic radiation. The device comprises two process chambers 11 and 12 in each of which objects are produced. They may be given by two process chambers which are spatially separated from each other or by a twin-chamber wherein each partial region forms a separate process chamber. Each of the process chambers comprises a building container 6 with a wall 16 and a building platform 4. The building platform 4 is connected to a vertical drive 15 which enables an up and down movement of the building platform 4 relative to the building container in the vertical direction.

A material application device 7 for applying the sintering powder to be applied onto the building platform 4 is arranged above the building container 6. A deflection unit 10 which is capable of directing a directed beam of electromagnetic radiation, in particular laser radiation, to any positions in an applied layer is arranged above the material application device 7. Preferably, this deflection unit 10 is a xy-scanner or a plotter.

As shown in FIG. 1, a radiation source 21 in form of a laser is arranged outside of the process chambers 11 and 12. The emitted laser beam is supplied to one process chamber 11 or to the other process chamber 12 via a switch device 22. In the case of the radiation source 21 being a laser having properties suited for fibre transmission, e.g. a NdYAG laser, the switch device 22 is formed to be a beam switch. To achieve this, the laser beam is supplied to the beam switch via a light conducting fibre or via a light conducting cable and is transmitted to the individual process chambers via light conducting fibres or via light conducting cables which are selectably connectable to it. In this way, the process chambers are each fixedly connected to the laser via light conducting fibres or via light conducting cables. However, the switch device 22 may also be formed to be a switchable optical element, particularly a mirror, where the laser beam propagates freely. Furthermore, FIG. 1 shows a built up object 24 which is surrounded by non-solidified powder 25.

In a modification, a beam splitter device, for example in form of a controllable optical element, is provided which allows to split the beam from the radiation source and to concurrently supply it to both chambers.

The device according to the first embodiment enables the use of one radiation source for two distinct process chambers which leads to multiple advantages in the production of a high number of components:

If not every process chamber is provided with its own radiation source, this leads to a noticeably lower capital expenditure for the increase of the number of process chambers.

The decoupling of radiation source and process chamber allows for lower security expenditures in designing of the process chamber.

The required space for a process chamber is lower due to the decoupling of radiation source and process chamber.

In operation, in both process chambers 11, 12 objects are concurrently produced. In doing so, the laser 21 is alternately connected to each of the two process chambers 11, 12. Particularly, a previously applied layer is irradiated in one process chamber while, at the same time, in the other process chamber a new layer is applied onto a layer which was selectively irradiated before and is eventually prepared for the irradiating, e.g. by pre-heating.

The method allows for a more effective use of the radiation source as compared to the conventional method. The degree of capacity utilization of the radiation source is considerably increased since it is used for irradiation in one building container during the time of the application of a layer in the other building container.

SECOND EMBODIMENT

The device according to a second embodiment differs from the one of the first embodiment in that a single radiation source is assigned to four process chambers. These may be given in form of spatially separated individual chambers or as partial regions of two twin-chambers or in form of a fourfold chamber.

Figure 2:
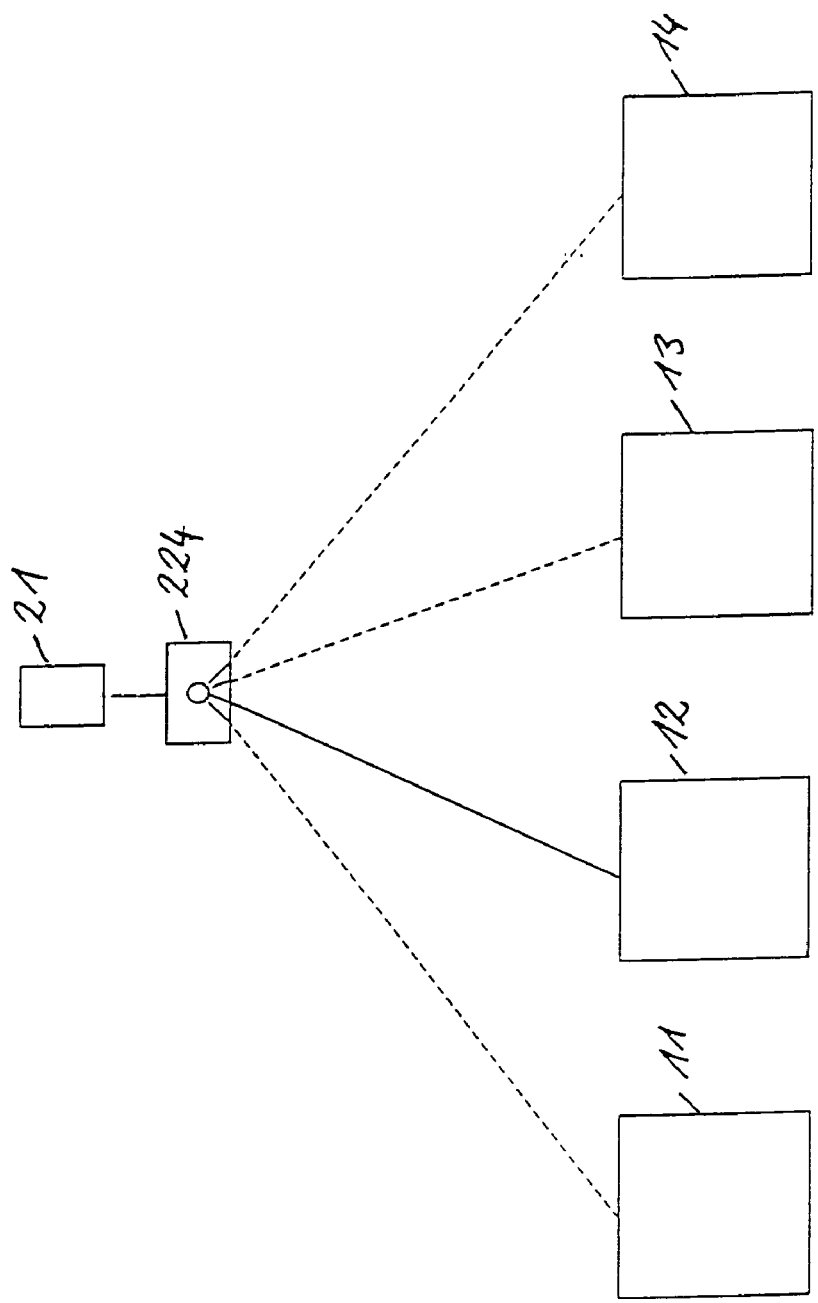
FIG. 2 shows a schematic illustration of a device according to a second embodiment of the invention.
Figure 3:
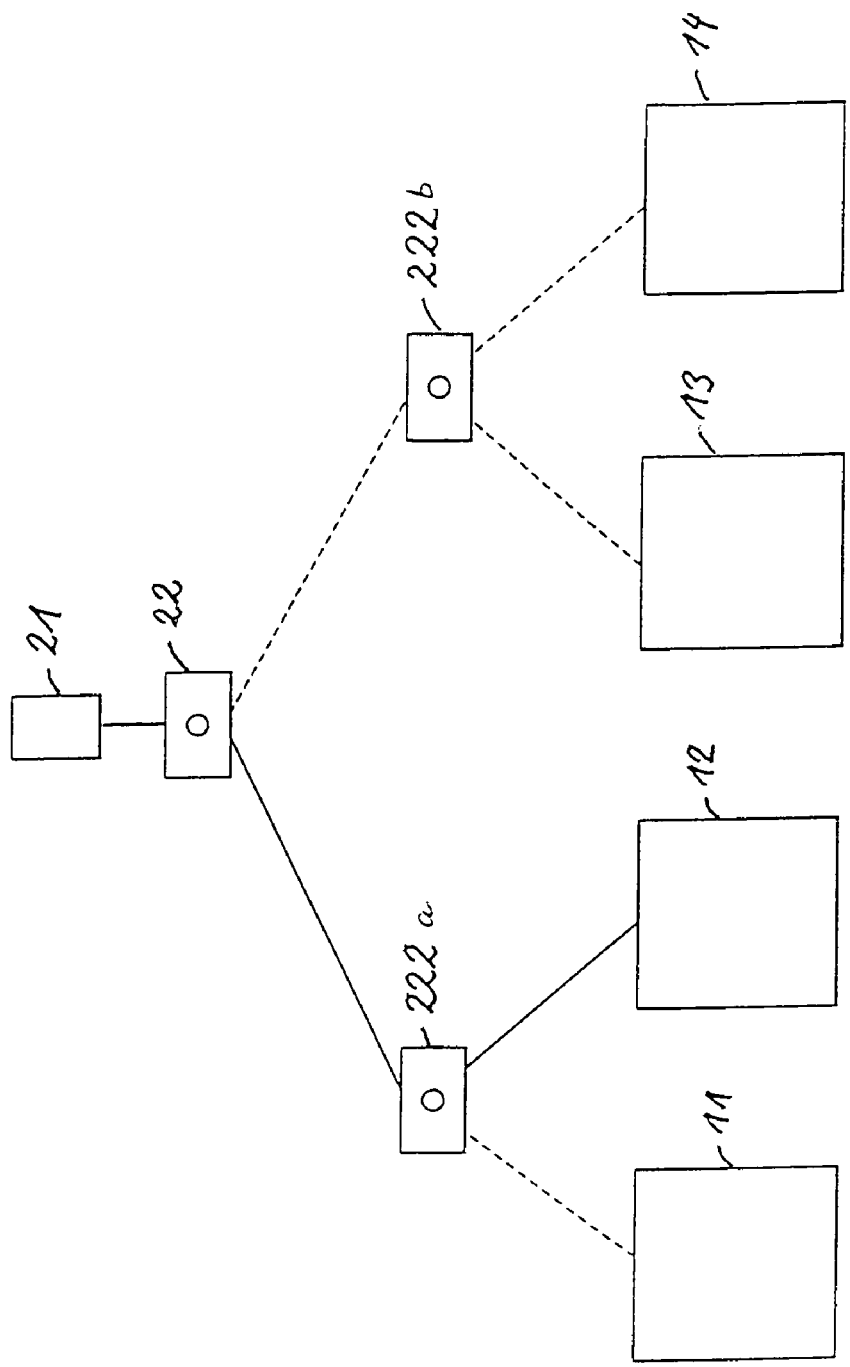
FIG. 3 shows a schematic illustration of a device according to a modification of the second embodiment of the invention.

FIG. 2 schematically shows a device according to a second embodiment of the invention. As can be seen in FIG. 2, the laser 21 is connectable to one of the process chambers 11, 12, 13, 14 each via a switch device 224. Alternatively, as shown in FIG. 3, to each two process chambers a switch device 222a and 222b, respectively, may be assigned whose input is connected to the output of a switch device 22 which is connected subsequent to the radiation source 21.

Figure 4:
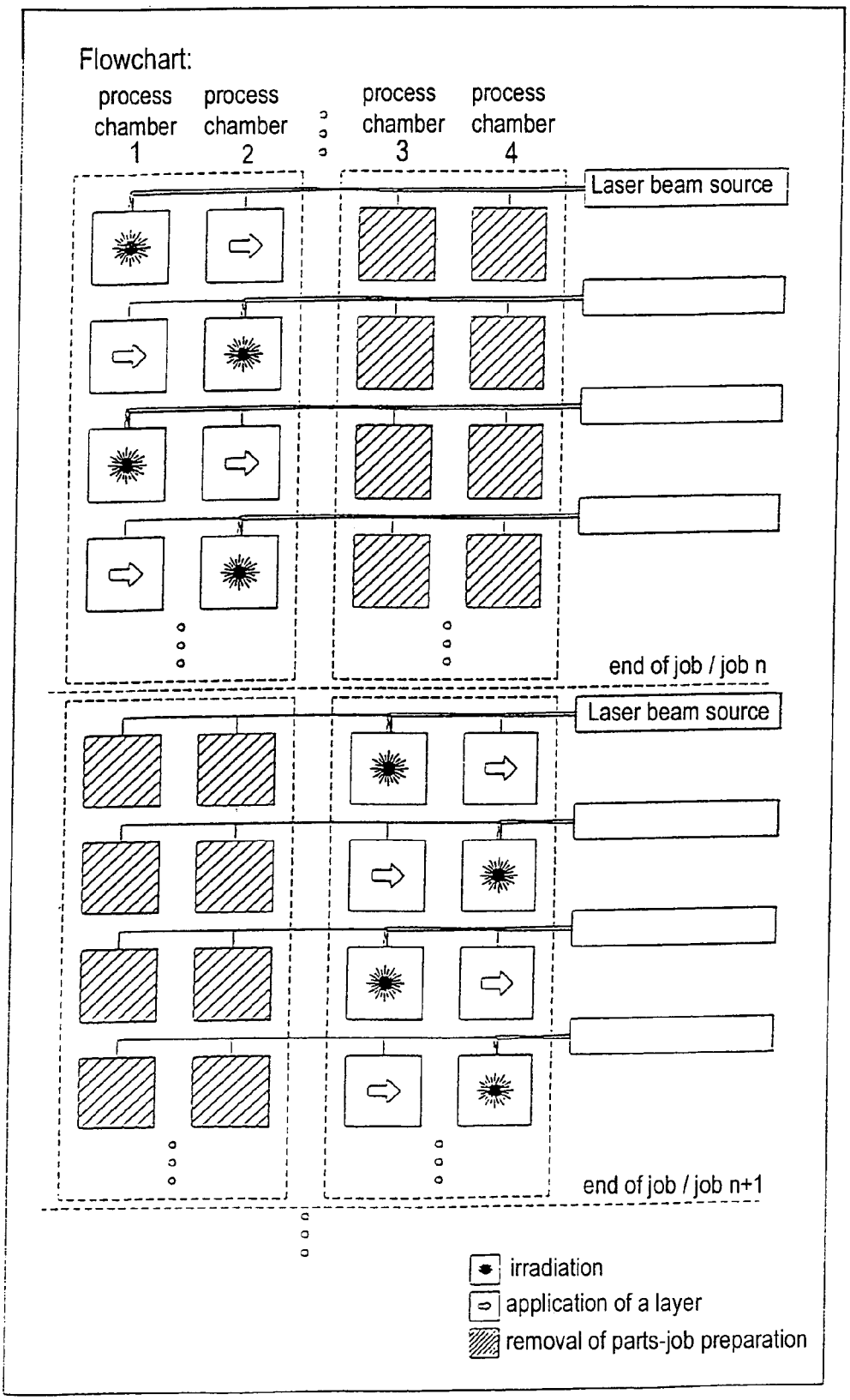
FIG. 4 shows a schematic illustration of a process workflow according to a second embodiment of the invention.

FIG. 4 shows a flowchart of a method according to a second embodiment of the invention. As illustrated in the upper half of FIG. 4, a building operation is concurrently performed in the process chambers 11 and 12. To achieve this, in a configuration according to FIG. 3, the switch device 22 supplies the radiation to the switch device 222a which is assigned to the process chambers 11 and 12. Then, the switch device 222a alternately supplies the radiation to the two process chambers 11 and 12, respectively. Particularly, a previously applied or prepared layer is irradiated in one process chamber while concurrently a new layer is prepared on a layer selectively irradiated before in the other process chamber. During the building operation in both process chambers 11 and 12, in the other two process chambers 13 and 14 completely built objects are removed from the process chambers and a new building operation in the process chambers is prepared.

As illustrated in the lower half of FIG. 4, a new building operation is performed in the process chambers 13 and 14 after completion of the building operation in the process chambers 11 and 12, while in both process chambers 11 and 12 completely built objects are removed from the process chambers and a new building operation is prepared. To achieve this, in a configuration according to FIG. 4 the switch device 22 supplies the radiation to the switch device 222b which is assigned to the process chambers 13 and 14. Then, the switch device 222b alternately supplies the radiation to both process chambers 13 and 14, respectively. Particularly, a previously applied layer is irradiated in one process chamber while in the other process chamber a new layer is concurrently applied onto a layer which was selectively irradiated before.

As in the first embodiment, the switch devices 22, 222a and 222b, respectively, are embodied to be switchable optical elements or beam switches for example. In the latter case, a fixed connection via a light conducting fibre or a light conducting cable exists between the beam switch 22 and the laser 21, on one hand, and the beam switch 22 and the respective beam switch 222a and 222b, on the other hand.

More than four process chambers and corresponding switch devices are provided in a further modification.

Both embodiments described above further have the advantage that powder materials different from each other can be used in the different process chambers. Furthermore, two batches can be produced in direct succession.

The invention is preferably applicable to selective laser sintering and selective laser melting, respectively, wherein a powder is used as the material to be solidified. However, it is not limited to this but also includes the use of a liquid, light-curable resin as known from stereolithography or the solidification of a powder material by means of the acting of a binder or binder system. In this case, the beam consists of particles of one or more components which interconnect the powder grains of the building material.

Apart from the number of process chambers described in the embodiments, any arbitrary number of process chambers or building regions and any combination of the number of radiation sources and the corresponding process chambers or building regions may be provided. Different materials, process conditions such as temperature or pressure or surrounding atmosphere, or parameters such as the laser power may be used in the process chambers.

What is claimed is:

1. Device for layerwise generative production of three-dimensional objects by acting of electromagnetic or particle radiation at respective positions corresponding to the cross-section of the object in the respective layer comprising:
   at least two building regions which are separated from each other for objects to be produced;
   a radiation source for emitting the electromagnetic or particle radiation toward the building regions, characterized by a switch device for switching a pathway of the radiation from the radiation source towards the building regions such that one building region is irradiated at a time, wherein the switch device comprises a switchable optical element or a beam switch, and
   a control device which controls the switch device to apply the radiation source for concurrent production of an object in each building region, such that during a process step in one building region which runs without participation of the radiation source, a process step with participation of the radiation source runs in another building region.

2. Device according to claim 1, characterized in that the building regions are provided in separate process chambers.

3. Device according to claim 1, characterized in that optical fibres are connected to the switch device for inputting and outputting of the radiation.

4. Device according to claim 1, characterized by a control device for the switch device formed such that during the solidification of a layer in the one building region, other process steps such as application of a layer, loading or unloading take place in another building region.

5. Device according to claim 1, characterized in that more than two building regions are provided which are assigned to either separated process chambers and/or partial regions of manifold-chambers.

6. Device according to claim 5, characterized in that at least one further switch device switching the radiation between the building regions of a manifold-chamber is provided.

7. Device according to claim 2, characterized in that at least one process chamber is formed hermetically impervious.

8. Device according to claim 2, characterized in that the process chamber comprises a heating or a cooling device.

9. Device according to claim 1, characterized in that the radiation source is formed to be a laser.

10. Device according to claim 1, characterized in that the radiation source is formed to be a source for generating a beam of particles of a binder material.

11. Device according to claim 3, characterized by a control device which controls the switch device such that during a process step in one building region which runs without participation of the radiation source, a process step with participation of the radiation source runs in another building region.

12. Device according to claim 1, characterized in that more than two building regions are provided which are assigned to either separated process chambers and/or partial regions of manifold-chambers.

* * * * *